United States Patent [19]

Hashizume

[11] Patent Number: 5,283,621
[45] Date of Patent: Feb. 1, 1994

[54] FIXING APPARATUS AND METHOD OF SUPPORTING A ROLLER SHAFT OF THE FIXING APPARATUS

[75] Inventor: Hiroshi Hashizume, Tokyo, Japan

[73] Assignee: Kabushiki Kaisha Toshiba, Kawasaki, Japan

[21] Appl. No.: 751,770

[22] Filed: Aug. 29, 1991

[30] Foreign Application Priority Data

Aug. 31, 1990 [JP] Japan .................................. 2-227995

[51] Int. Cl.⁵ .......................................... G03G 21/00
[52] U.S. Cl. .................. 355/290; 100/93 RP; 100/171; 355/282; 384/276; 384/418; 384/419
[58] Field of Search ............... 355/282, 285, 289, 290, 355/295; 219/216; 384/276, 300, 418-419, 442-443; 100/171, 93 RP

[56] References Cited

U.S. PATENT DOCUMENTS

| 3,616,520 | 11/1971 | Bucalo | 384/276 X |
| 3,972,576 | 8/1976 | Hill | 384/276 |
| 4,757,347 | 8/1988 | Tamaoki et al. | |
| 4,758,202 | 7/1988 | Maciag et al. | 384/276 X |
| 4,802,439 | 2/1989 | Sugimoto et al. | 100/171 X |
| 5,045,887 | 9/1991 | Nakamura | 355/290 X |

FOREIGN PATENT DOCUMENTS

| 0446094 | 6/1927 | Fed. Rep. of Germany | 384/276 |
| 0834479 | 3/1952 | Fed. Rep. of Germany | 384/276 |
| 0819019 | 10/1937 | France | 384/276 |
| 0607400 | 8/1948 | United Kingdom | 384/276 |

Primary Examiner—Matthew S. Smith
Attorney, Agent, or Firm—Finnegan, Henderson, Farabow, Garrett & Dunner

[57] ABSTRACT

A fixing apparatus comprises a forcibly rotated heat roller, a pressing roller rotated in contact with the heat roller, a roller shaft for supporting the pressing roller, a heater for heating the heat roller, a pair of plain bearings for supporting the roller shaft, and springs for supporting each plain bearing and urging the plain bearing towards the heat roller. According to one mode, each plain bearing has a shaft contact portion having an axial length less than that of the plain bearing. According to another mode, the roller shaft is provided with a bearing contact portion having an axial length less than that of the body of the plain bearing.

10 Claims, 7 Drawing Sheets

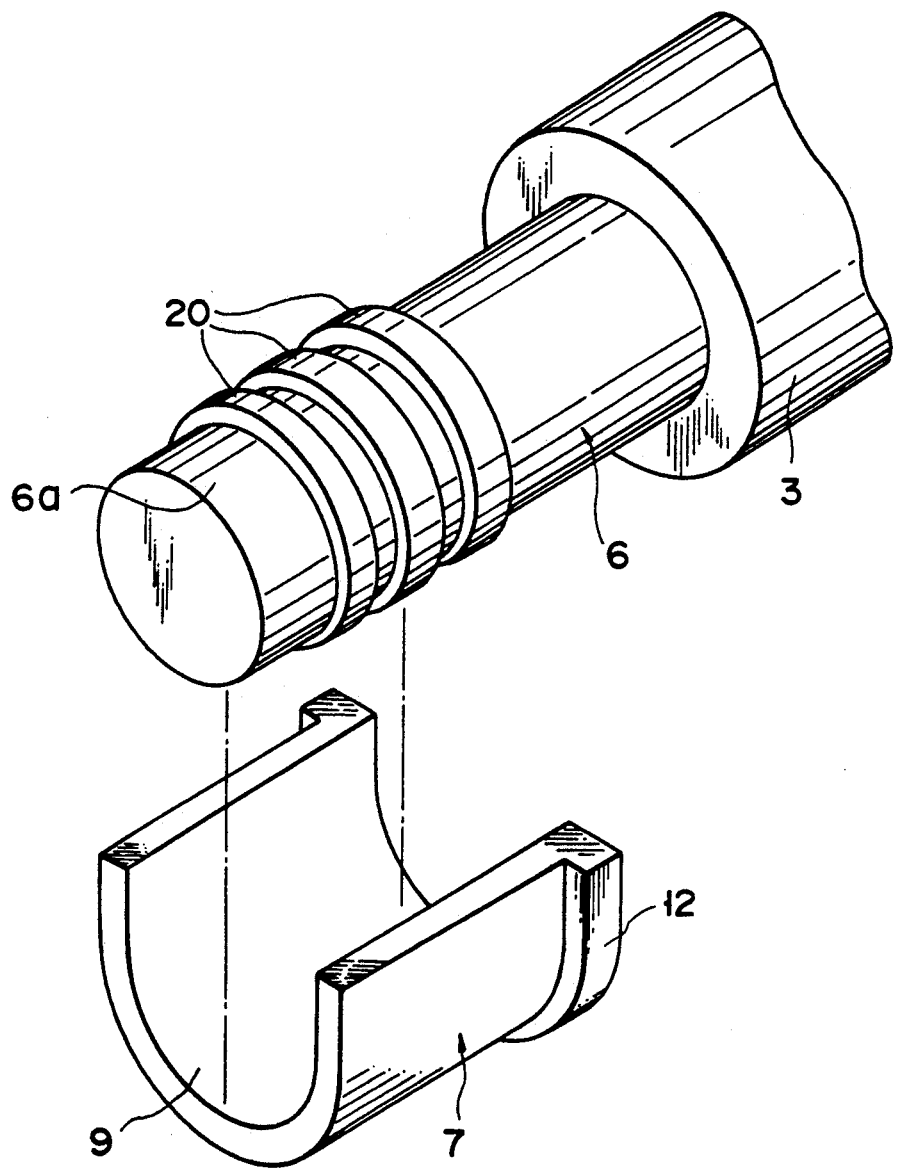
F I G. 11

FIXING APPARATUS AND METHOD OF SUPPORTING A ROLLER SHAFT OF THE FIXING APPARATUS

BACKGROUND OF THE INVENTION

1. Field of the Invention

The present invention relates to a heat roller type fixing apparatus provided in an electronic photographing apparatus and a method of supporting a roller shaft of a pressing roller provided in the fixing apparatus.

2. Description of the Related Art

In an electronic photographing apparatus, an image is formed on a recording paper sheet while a photosensitive drum is rotated 360° according to the following process. First, a photo-sensitive face of the drum is electrified by an electrifier. Then, a light signal is radiated on the photo-sensitive face by an exposing device so that an electroslatic latent image is formed on the photo-sensitive face. Then, toner is adhered to an electrostatic latent image on the drum by means of a developing apparatus. The toner image formed on the drum is transferred onto the recording paper sheet by a transfer apparatus. Finally, the toner image on the paper sheet is fixed by a fixing apparatus.

One type of the fixing apparatus provided in the electronic photographing apparatus is a heat roller type fixing apparatus.

According to the heat roller type fixing apparatus, a heat roller is heated by heating means, and a recording paper sheet on which an image has been transferred is passed between a heat roller and a pressing roller. At this time, the paper sheet is pressed by the pressing roller and the toner image bearing surface of the paper sheet is brought into contact with the heat roller. Thus, the toner image on the toner image bearing surface of the paper sheet is heated, pressed on the paper sheet, and fixed.

The heat roller type fixing apparatus is constituted by providing the heat roller, pressing roller and heating means in the body of the apparatus.

The heat roller is constituted by coating the surface of an aluminum cylinder with a synthetic resin material having a good mold release property and heat resistance property. The heat roller is forcibly driven by a rotary drive device. The pressing roller is formed of an elastic material having a heat insulation property and heat resistance property. The pressing roller is formed of the elastic material in order to bring the recording paper sheet into stable contact with the heat roller. The pressing roller is supported on a roller shaft. The roller shaft is made of a metal. This is because the use of metal increases a wear resistance of the roller shaft.

The roller shaft is rotatably supported on plain bearings which are made of a synthetic resin with high wear resistance. The synthetic resin is inexpensive and light. The lower portions of the plain bearings are supported by compression coil springs. The pressing roller is urged towards the heat roller by the plain bearings which are pushed by the springs. Thus, the pressing roller presses the recording paper sheet on the heat roller.

When the heat roller is forcibly rotated, the rotation is transmitted to the pressing roller by friction with the heat roller and paper sheet. As a result, both rollers rotate to convey the paper sheet and at the same time the toner image on the paper sheet is fixed.

The conventional heat roller type fixing apparatus, however, has the following problem:

The rotation of the pressing roller is delayed with respect to the rotation of the heat roller. Consequently, a slip due to the difference in rotational speed occurs between the pressing roller and the heat roller. Owing to the slip, the recording paper sheet may also slip over the heat roller, and the toner image transferred on the paper sheet may be distorted.

SUMMARY OF THE INVENTION

A first object of the present invention is to provide a heat roller type fixing apparatus capable of preventing a slip between a heat roller and a pressing roller and fixing an image on a recording paper sheet without distorting the image.

A second object of the invention is to provide a heat roller type fixing apparatus capable of preventing a slip between a heat roller and a pressing roller, with a simple structure.

A third object of the invention is to provide a method of supporting a roller shaft of a heat roller type fixing apparatus capable of preventing a slip between a heat roller and a pressing roller by a simple method.

A fixing apparatus according to this invention comprises: a heat roller rotatable upon receiving a torque; a pressing roller rotatable in contact with the heat roller; a roller shaft having an outer peripheral surface and supporting the pressing roller; a heater for heating the heat roller; a pair of pain bearings for rotatably supporting the roller shaft; and urging means for supporting each plain bearing and urging the plain bearing towards the heat roller.

According to a first mode of the fixing apparatus of this invention, each plain bearing has an inner surface surrounding the roller shaft and a predetermined axial length, and a shaft contact portion projecting from the inner surface. The shaft contact portion is put in contact with the outer peripheral surface of the roller shaft and has a length along the axis of the roller shaft less than the axial length of the inner surface.

According to a second mode of the fixing apparatus of this invention, the roller shaft has an annular bearing contact portion projecting from the outer peripheral surface of the roller shaft and extending continuously in the circumferential direction of the roller shaft. Each plain bearing includes an inner surface surrounding the roller shaft and supporting the bearing contact portion of the roller shaft, and also has a length along the axis of the roller shaft greater than that of the bearing contact portion of the roller shaft.

A method of supporting a roller shaft of a fixing apparatus, according to the present invention, comprises the steps of: urging a pair of plain bearings; supporting a shaft of a pressing roller on said pair of plain bearings, with a contact area having a length less than the axial length of each plain bearing; and bringing the pressing roller into contact with a heat roller.

According to the above structures, the roller shaft and the plain bearings are put in contact with each other with a smaller contact area than in the prior art, thereby reducing a frictional force between the roller shaft and the plain bearings. In addition, the ratio of non-uniform contact area between the respective parts of the roller shaft along the axis thereof and the plain bearings is decreased, and the roller shaft is stably supported by the plain bearings. By virtue of these features, the load applied to the pressing roller is reduced and a slip between the pressing roller and the heat roller is prevented. Thus, a recording paper sheet can stably be conveyed without slip, and excellent fixing of image can be carried out.

In addition, a slip between the pressing roller and the heat roller can be prevented by a simple structure wherein a shaft contact portion is provided on each of the plain bearings or a bearing contact portion is provided on the roller shaft.

Furthermore, the roller shaft and the plain bearings are surely brought into contact, and the grounding of the roller shaft can be ensured. In other words, since the pressing roller is charged with static electricity by the contact with the recording paper sheet, the metallic roller shaft is grounded via a member (not shown) to eliminate static electricity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 11 is a perspective view showing a roller shaft and a plain bearing in another embodiment according to the second mode of the invention.

DETAILED DESCRIPTION OF THE PREFERRED EMBODIMENTS

An embodiment of the fixing apparatus of the present invention, according to a mode wherein a shaft contact portion is provided on a plain bearing, will now be described with reference to accompanying FIGS. 1 to 7.

Figure 1:
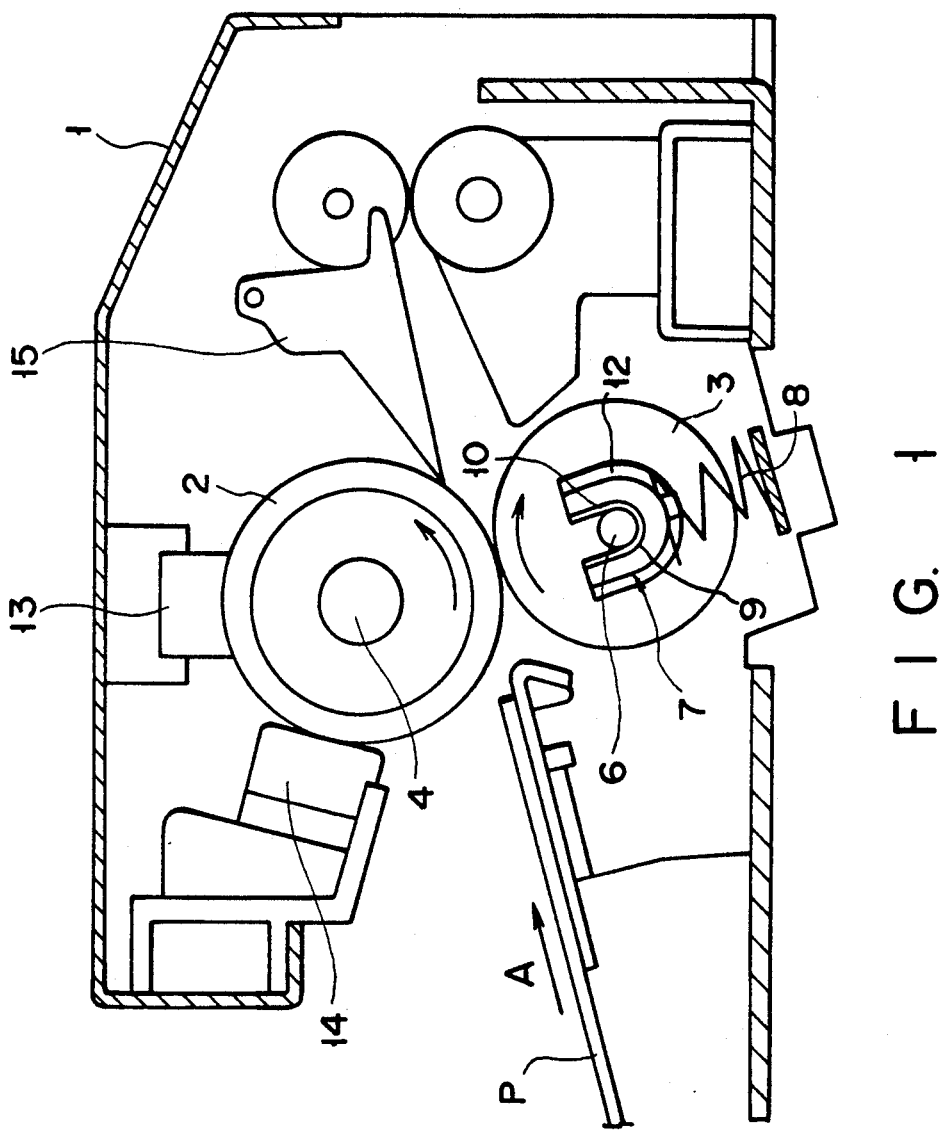
FIG. 1 is a perspective view showing an embodiment of a fixing apparatus according to a first mode of the present invention.

FIG. 1 shows a schematic structure of the fixing apparatus including a device body 1, a heat roller 2, a pressing roller 3 and a halogen lamp 4.

The apparatus body 1 constitutes a casing.

The heat roller 2 is constituted by coating a synthetic resin having a good mold release property and heat resistance on the surface of an aluminum cylinder. The resin of the heat roller 2 is, typically, polytetrafluoroethylene (PTFE), or tetrafluoroetyleneperfluoroalkyl vinyl ethyl ether polymer (PFA).

Figure 3:
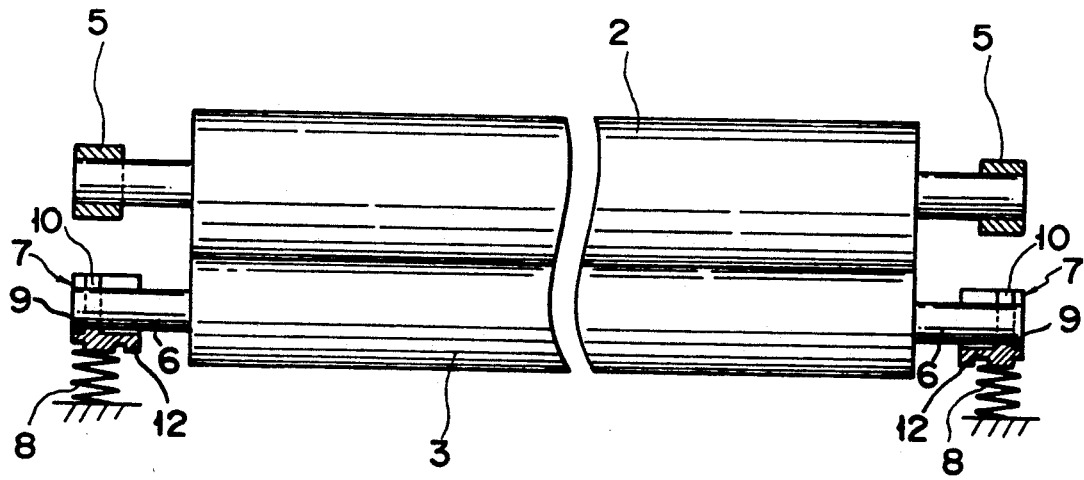
FIG. 3 is a plan view showing roller shafts and plain bearings.

As shown in FIG. 3, the heat roller 2 is situated horizontally and is rotatably supported on a pair of bearings 5. The bearings 5 are attached on both side walls of the apparatus body 1. The heat roller 2 is rotated by a rotary drive device (not shown).

The halogen lamp 4 is provided within the heat roller 2 and is supported by a support member (not shown). The halogen lamp 4 is an example of heating means for heating the heat roller 2..

The pressing roller 3 is formed of an elastic material having a heat insulation property and a heat resistance property. The material of the pressing roller 3 is, for example, silicone rubber. As is shown in FIGS. 1 to 4, the pressing roller 3 is fitted on a roller shaft 6.

Figure 2:
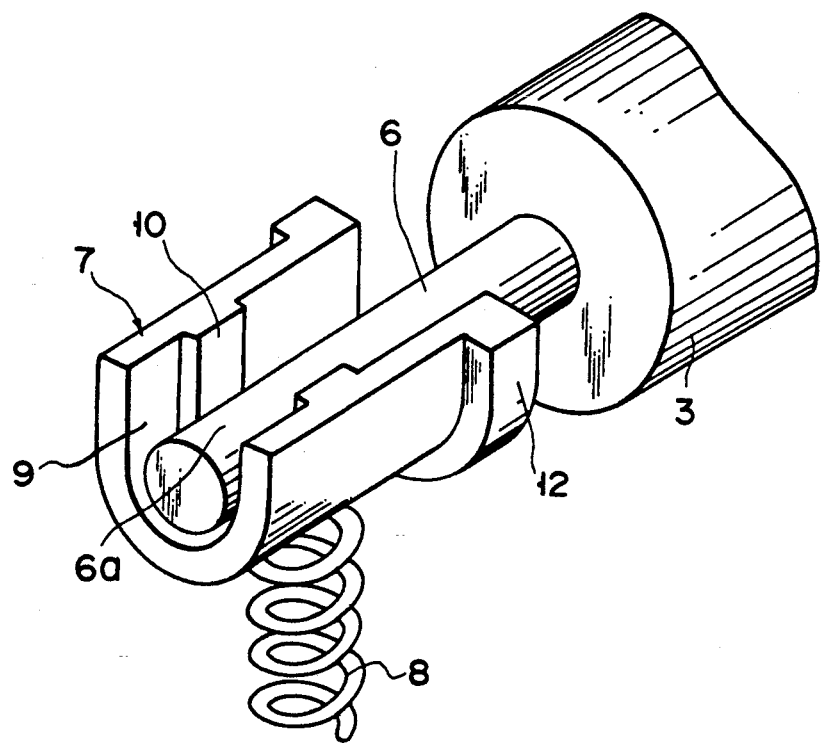
FIG. 2 is a perspective view showing a roller shaft of a pressing roller and a plain bearing.

The roller shaft 6 has a circular cross section and is longer than the pressing roller 3. Both end portions of the roller shaft 6 project from both end faces of the pressing roller 3. In FIG. 2, numeral 6a denotes an outer peripheral surface of an end portion of the roller shaft 6 projecting from the pressing roller 3. The roller shaft 6 is made of a metal.

As is shown in FIG. 3, the pressing roller 3 is horizontally situated under the heat roller 2. As is shown in FIGS. 1 to 4, both end portions of the roller shaft 6 are rotatably supported by a pair of plain bearings 7. The lower portions of the plain bearings 7 are supported by compression coil springs 8, thus applying force to the heat roller 2. The compression coil springs 8 are an example of urging means.

Figure 4:
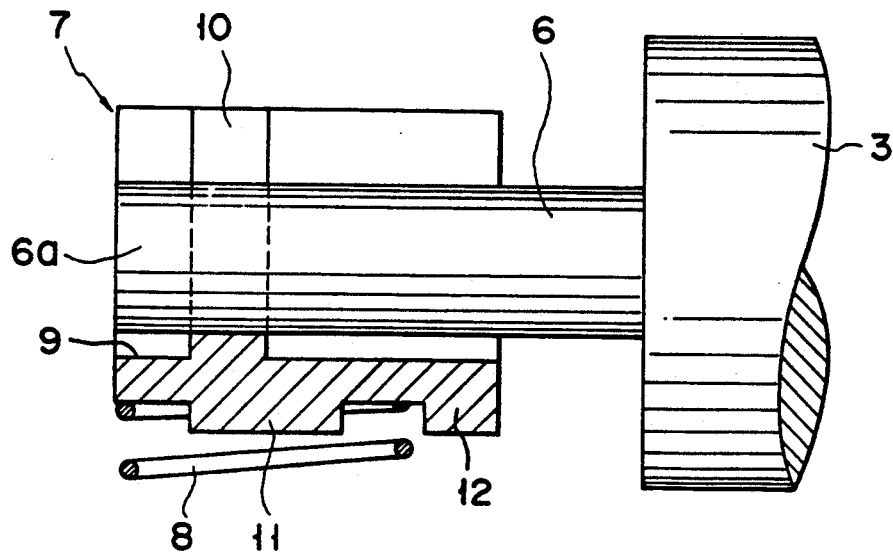
FIG. 4 is an enlarged cross-sectional view showing the roller shaft and plain bearing.
Figure 5:
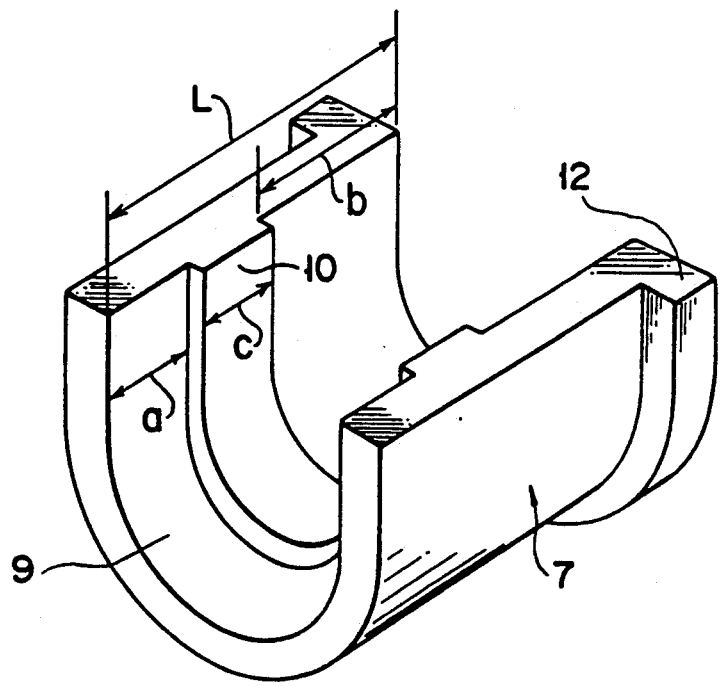
FIG. 5 is an enlarged perspective view of the plain bearing.

The plain bearings 7 will now be described. Each plain bearing 7 is made of a synthetic resin having a high wear resistance. As is shown in FIGS. 4 and 5, the plain bearing 7 has such a groove shape as to surround a lower portion of the roller shaft 6, and has an inner surface 9 which surround the outer peripheral surface 6a of the roller shaft 6. Both ends of each bearing 7 in the axial direction of the roller shaft 6 are opened, and the lower part of the body 9 is semicircular. The upper part of the bearing 7 is opened along the axis of the roller shaft 6.

A shaft contact portion 10 is formed to project from the inner surface 9 of the bearing 7. The shaft contact portion 10 is situate at the center of the roller shaft 6 in the axial direction. The axial length of the shaft contact portion 10 (indicated as "c" in FIG. 5) is smaller than the length of the bearing 7 along the axis of the shaft 6 (indicated as "L" in FIG. 5). Those portions of the inner surface 9 which do not contact roller shaft 6 (i.e., non-contact portions) have a total axial length ("a"+"b" in FIG. 5) that is greater than the axial length "c"of the shaft contact portion 10. The shaft contact portion 10 is a single strip extending along the inner surface 9 in the circumferential direction of the roller shaft 6.

A spring receiving portion 11 is formed on the outer surface of the lower part of the bearing 7. A pair of flange-shaped engaging portions 12 are formed on one end portion of the bearing 7.

The axial length and width of the bearing 7 are determined on the basis of such conditions as the length of the end portion of the roller shaft 6, the formation of the spring receiving portion 11 and engaging portions 12, and the ensuring of strength. The axial length of the shaft contact portion 10 is determined on the basis of such conditions as the ensuring of strength for supporting of the roller shaft 6, and the size of the area of contact with the roller shaft 6. The position of the shaft contact portion 10 on inner surface 9 is determined on the basis of such conditions as the ensuring of strength for supporting of the roller shaft 6. The plain bearings 7 are arranged at a distance from the pressing roller 3 in the axial direction, as shown in FIG. 3.

The engaging portions 12 of the plain bearings 7 are supported by bearing support members (not shown) so as to be vertically movable. The bearing support members are formed on the apparatus body 1. Compression coil springs 8 are arranged under the plain bearings 7. The springs 8 are supported on suitable locations on the apparatus body 1. The compression coil spring 8 are engaged with the spring receiving portions 11 of the plain bearings 7.

Both end portions of the roller shaft 6 are inserted toward the inner surface 9 of plain bearing 7 and are put in contact with the shaft contact portion 10. The lower part of the outer peripheral surface 6a of the roller shaft 6 is supported by that part of the shaft contact portion 10 which is formed along the semicircular portion of the inner surface of the bearing 7. The lower part of the outer peripheral surface 6a of the roller shaft 6 is not put in contact with the inner surface 9. Thus, the end portions of the roller shaft 6 are rotatably supported by the plain bearings 7.

The axial length of the shaft contact portion 10 is smaller than that of the bearing 7. Thus, the contact area between the shaft contact portion 10 of the bearing 7 and the roller shaft 6 is smaller than the contact area supposed when the entire length of inner surface 9 is put in contact with the roller shaft 6. The contact area between the shaft contact portion 10 and the roller shaft 6 is determined so that the frictional force between the plain bearing 7 and the roller shaft 6 becomes lower than that between the pressing roller 3 and the recording paper sheet P.

In this manner, the pressing roller 3 is provided so that it can be vertically moved by compression coil springs 8, and an elastic force is applied to the heat roller 2. Thus, the pressing roller 3 is brought into contact with the heat roller 2.

Referring back to FIG. 1, reference numeral 13 denotes a cleaner for removing toner remaining on the surface of the heat roller 2; 14 a temperature detector for detecting the surface temperature of the heat roller 2; and 15 a claw for separating the recording paper sheet P from the heat roller 2.

The fixing apparatus according to the present invention is provided within the body of an electronic photographing apparatus.

The fixing process by the fixing device will now be described. The heat roller 2 is heated by the halogen lamp 4. The heat roller 2 is forcibly rotated by the rotary drive device (not shown). The rotation of the heat roller 2 is transmitted to the pressing roller 3, and the roller shaft 6 supported on the plain bearings 7 is rotated along with the pressing roller 3.

The recording paper sheet P, on which an image has been transferred by the electronic photographing apparatus, is conveyed to the fixing apparatus. The pressing roller 3 is driven by the heat roller 2, with the paper sheet P interposed. The paper sheet P is conveyed through a gap between the heat roller 2 and the pressing roller 3 in the direction of arrow A. The toner image on the paper sheet P is pressed by the pressing roller 3 and heated and fixed by the heat roller 2.

The inventor of the present invention has studied for a long time about the phenomenon of a slip occurring between the heat roller and the pressing roller in the thermal fixing apparatus. This phenomenon will now be described.

As stated above, the heat roller 2 is forcibly rotated by a driving force. When the paper sheet P is conveyed, the rotation of the heat roller 2 is transmitted to the pressing roller 3 via the paper sheet P. Thus, when the paper sheet P is conveyed by the heat roller 2 and pressing roller 3, if a load greater than a frictional force acting between the recording paper sheet P and pressing roller 3 is applied to the rotation of pressing roller 3, the rotational speed of the heat roller 2 differs from that of the pressing roller 3 and a slip occurs therebetween.

A main cause of such a great load on the pressing roller 3 is a frictional force between the roller shaft 6 of the pressing roller 3 and the plain bearing 7. Thus, when the paper sheet P is conveyed by the heat roller 2 and pressing roller 3, if the frictional force between the roller shaft 6 and the plain bearing 7 is made less than the frictional force between the pressing roller 3 and paper sheet P, the slip between the heat roller 2 and the pressing roller 3 can be prevented.

The inventor has found that the frictional force between the roller shaft 6 and the plain bearing 7 can be decreased by reducing the contact area therebetween. There are two reasons for this.

One of the two reasons is as follows.

A frictional force occurring when a moving object is put in sliding contact with the plain bearing 7 is given by the equation: $F = \mu W$ (where $F$ = frictional force, $\mu$ = friction coefficient, and $W$ = weight of object).

Figure 6:
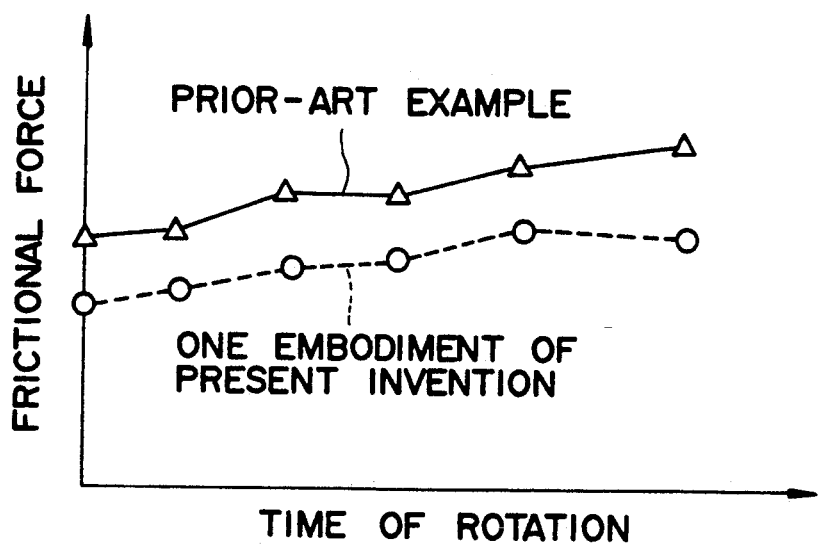
FIG. 6 is a graph showing a variation in frictional force acting between the plain bearing and the roller shaft.

FIG. 6 is a graph showing experimental data of frictional force between the plain bearing 7 and the roller shaft 6. The data of the prior-art example is indicated by a solid line, and the data of the embodiment of this invention is indicated by a broken line. In the experiment, the plain bearing 7 of the embodiment shown in FIGS. 1 to 5 and a conventional plain bearing (prior-art example in which outer peripheral surface 6a of roller shaft 6 contacts inner surface 9) were employed. The roller shaft 6 of the pressing roller 3 was supported on each plain bearing, and the variation of frictional force at the time of rotating the roller shaft 6, with the passage of time of rotation, was measured. It is understood, from the graph, that the frictional force of the plain bearing 7 of the present embodiment is lower than that of the conventional plain bearing. From the experimental data, it can be guessed that the frictional force between the plain bearing 7 and the roller shaft 6 relates to the contact area therebetween.

On the other hand, of the elements $\mu$ and $W$ in the above equation, $W$ (weight of roller shaft 6) is constant. It can be thus guessed that $\mu = f(S)$, that is, the friction coefficient $\mu$ is a function of the contact area $S$. In addition, where the contact area $S$ is small, the frictional force $F$ is low, and it can be supposed, therefore, that $\mu = c \cdot S$ ($c$ = a constant coefficient). Therefore, F=α·S·W. From this, it is understood that the frictional force F can be decreased by reducing the contact are between the roller shaft 6 and the plain bearing 7.

The other reason is as follows.

A cause of a great load on the rotation of pressing roller 3 is the prevention of smooth rotation of the roller shaft 6 due to the combination of the machining error of the outer peripheral surface 6a of roller shaft 6 and that of the shaft contact surface of bearing 7 which contacts the surface 6a. In other words, it is technically difficult to form the outer peripheral surface 6a of roller shaft 6 with high, uniform roundness, and also to form the shaft contact surface of the plain bearing 7 with high, uniform roundness. Thus, machining errors occur in the roller shaft 6 and plain bearing 7. Owing to the sum of the machining errors, the outer peripheral surface 6a of the roller shaft 6 are put in non-uniform contact with the shaft contact surface of the plain bearing 7. This non-uniform contact prevents smooth rotation of the roller shaft 6. This undesirable phenomenon becomes conspicuous as the contact area between the roller shaft 6 and the plain bearing 7 is greater.

If the axial length of the plain bearing 7 is decreased, the ratio of non-uniform contact between the outer peripheral surface 6a of the roller shaft 6 and the shaft contact surface of the plain bearing 7 decreases. Thus, the roller shaft 6 can be stably supported by the plain bearings 7.

The structure of the plain bearings 7 has been studied in order to reduce the contact area between the roller shaft 6 and the plain bearing 7, on the basis of the above two reasons. The plain bearing 7 requires the above-stated structural elements and the predetermined length (axial length of the bearing) and width to withstand the pressing force of the spring.

In the plain bearing 7 employed in the conventional thermal fixing apparatus, the shaft contact area between the plain bearing 7 and the roller shaft 6 is provided over the entire length (axial length) of the plain bearing 7. However, the shaft contact area between the plain bearing 7 and the roller shaft 6 need not necessarily be provided over the entire length of the plain bearing 7; it is sufficient to provide a contact area capable of rotably and stably supporting the roller shaft 6.

In other words, in order to reduce the contact area between the roller shaft 6 and the plain bearing 7, it is sufficient to make the length of the contact area between the roller shaft 6 and the plain bearing 7 less than the entire length of the plain bearing 6.

In the present embodiment, the contact area between the plain bearings 7 and roller shaft 6 is less than that in the prior art. Thus, the frictional force between the outer peripheral surface 6a of roller shaft 6 and the shaft contact portion 10 of the plain bearing 7 is lower than the frictional force between the pressing roller 3 and recording paper sheet P, on the other. In addition, the ratio of non-uniform contact between the outer peripheral surface 6a of the roller shaft 6 and the plain bearing 7 decreases. Thus, the roller shaft 6 can be stably supported by the shaft contact portion 10 of the plain bearings 7.

The load applied to the rotation of pressing roller 3 is less than the frictional force acting between the pressing roller 3 and recording paper sheet P. Thus, the paper sheet P is conveyed without slipping on the heat roller 2, and the toner image on the paper sheet P is fixed with high quality, without being distorted.

The pressing roller 3 is charged with static electricity owing to the contact with the paper sheet P. In order to eliminate the static electricity, the pressing roller 3 is grounded via metallic roller shaft 6 and shaft contact portion 10. In this embodiment, the roller shaft 6 and the plain bearing 7 are surely put in contact with each other, and the grounding of roller shaft 6 is ensured.

According to the fixing apparatus of the present invention, the mode in which the shaft contact portion is provided on the plain bearing is not limited to the above-described embodiment, and the shaft contact portion can be provided in various modes.

Figure 7:
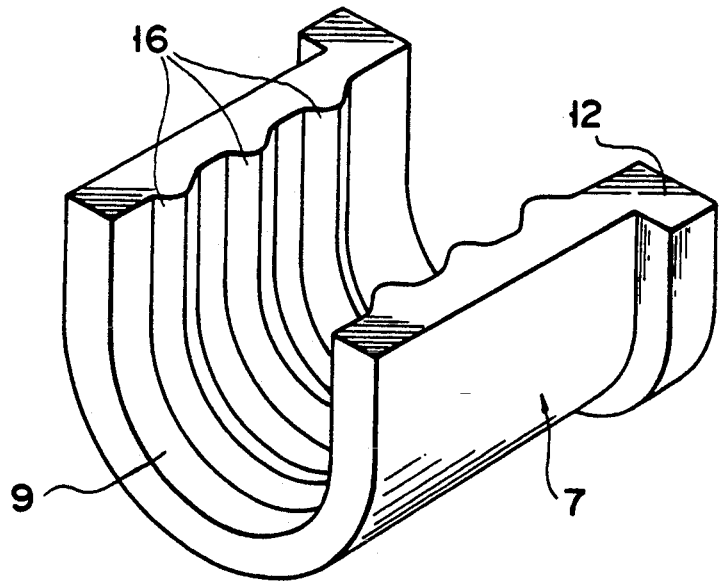
FIG. 7 is a perspective view showing a plain bearing in another embodiment according to the first mode of the invention.

FIG. 7 shows another embodiment. In FIG. 7, the structural elements already shown in FIG. 5 are denoted by like reference numerals, and a description thereof is omitted. In this embodiment, a plurality of shaft contact portions 16 are provided on the inner surface 9 of the plain bearing 7 such that the contact portions 16 are arranged at regular intervals in the axial direction of plain bearing 7. The contact area between each shaft contact portion 16 and outer peripheral surface 6a of roller shaft 6 is smaller than that of the shaft contact portion 10 of the above embodiment. By changing the number of shaft contact portions 16, the total area of the shaft contact portions 16 of the plain bearing 7 can be adjusted. For example, the total area of the shaft contact portions 16 may be set to be equal to the area of the shaft contact portion 10 of the plain bearing in the above-described embodiment.

Figure 8:
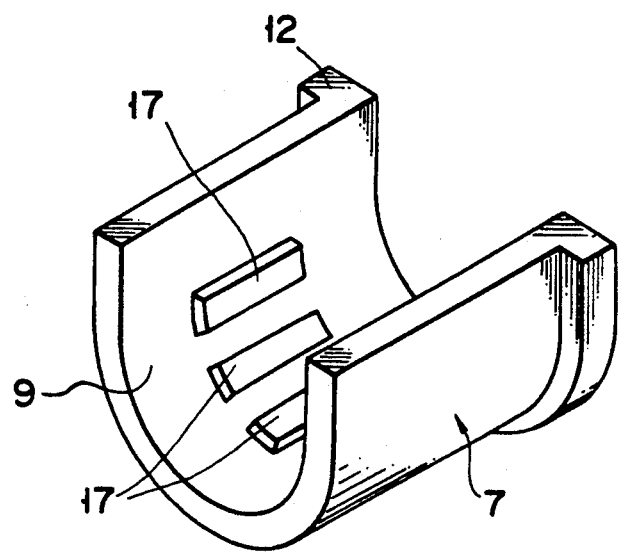
FIG. 8 is a perspective view showing a plain bearing in another embodiment according to the first mode of the invention.
Figure 9:
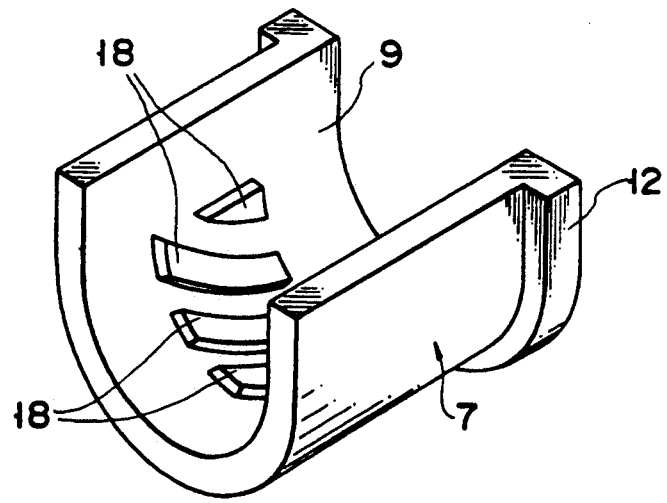
FIG. 9 is a perspective view showing a plain bearing in another embodiment according to the first mode of the invention.

FIGS. 8 and 9 show other embodiments.

In the embodiment of FIG. 8, a plurality of shaft contact portions 17 are arranged on the inner surface 9 of the plain bearing 7 at regular intervals in the circumferential direction of the inner surface 9. By changing the number of shaft contact portions 17, the total area of the shaft contact portions of the plain bearing 7 can be controlled.

In the embodiment of FIG. 9, a plurality of shaft contact portions 18 are helically arranged on the inner surface 9 the plain bearing 7. According to this embodiment, each shaft contact portion 18 extends in a helical shape, the roller shaft 6 can be stably supported when it rotates.

An embodiment of the fixing apparatus of the present invention, according to a mode wherein the bearing contact portion is provided on the roller shaft, will now be described with reference to FIG. 10.

Figure 10:
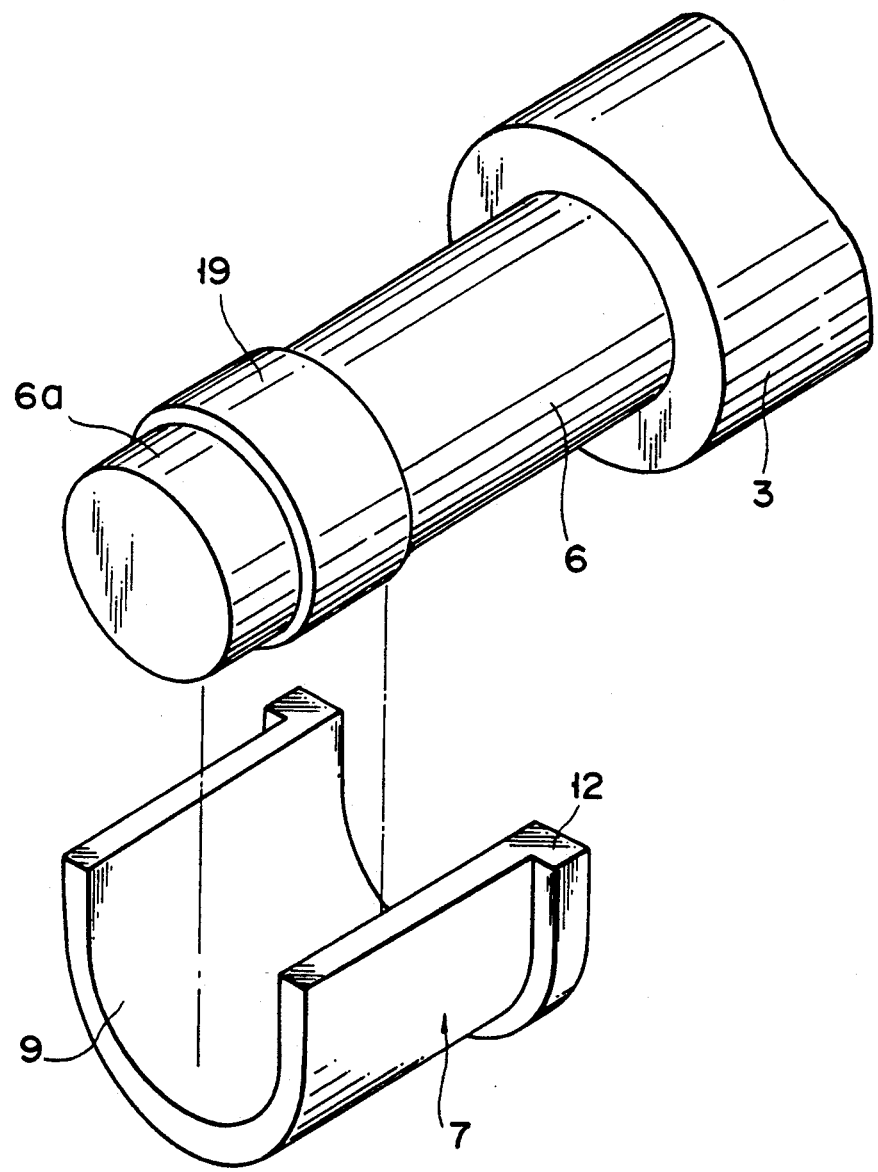
FIG. 10 is a perspective view showing a roller shaft and a plain bearing in an embodiment of a fixing device according to a second mode of the present invention.

In FIG. 10, the structural elements already shown in FIG. 5 are denoted by like reference numerals, and a description thereof is omitted A single bearing contact portion 19 is formed on the outer peripheral surface 6a of an end portion of the roller shaft 6, such that the portion 19 extends in the circumferential direction of the shaft 6 in a strip-shape. The bearing contact portion 19 is brought into contact with the inner surface 9 of the plain bearing 7 when the roller shaft 6 is supported on the plain bearing 7.

The axial length of the bearing contact portion 19 is less than the axial length of the plain bearing 7, and the former is determined on the basis of the contact area between the roller shaft 6 and the plain bearing 7. The contact area between the roller shaft 6 and the plain bearing 7 is smaller than the contact are obtainable when the outer peripheral surface of the roller shaft 6 is put in contact with the entire length of the inner surface 9. This contact area is determined so that the frictional force between the plain bearing 7 and the roller shaft 6 becomes smaller than the frictional force between the pressing roller 3 and the recording paper sheet P.

The inner surface 9 of the plain bearing 7 is flat.

In this embodiment, the contact area between the shaft contact portion 19 of roller shaft 6 and the inner surface 9 is less than the contact area obtainable when the outer peripheral surface 6a of roller shaft 6 is put in contact with the entire inner surface 9 of the plain bearing 7. The frictional force between the bearing contact portion 19 of the roller shaft 6 and the inner surface 9 of plain bearing 7 is less than the frictional force between the pressing roller 3 and recording paper sheet P. The roller shaft 6 is stably supported on the plain bearings 7. Accordingly, the load applied to the rotation of pressing roller 3 is less than the frictional force between the pressing roller 3 and paper sheet P. Thereby, the pressing roller 3 and the heat roller 2 rotate in synchronism and no slip occurs therebetween. Thus, the paper sheet P is conveyed without slipping on the heat roller 2, and the toner image on the paper sheet P is fixed with high quality, without being distorted.

FIG. 11 shows another embodiment of the invention.

In this embodiment, a plurality of bearing contact portions 20 are provided on the outer peripheral surface 6a of an end portion of the roller shaft 6 at intervals along the axis of the roller shaft 6. The contact area between each bearing contact portion 20 and the inner surface 9 of plain bearings 7 is less than the area of the bearing contact portion 19 of the above-described embodiment. By changing the number of bearing contact portions 20, the total area of the bearing contact portions 20 on the roller shaft 6 can be adjusted. For example, the total area of the bearing contact portions 20 may be made equal to the area of the bearing contact portion 19 of the above-described embodiment.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A fixing apparatus comprising:
   a heat roller rotatable upon receiving a torque;
   a pressing roller rotatable in contact with the heat roller;
   a roller shaft having an outer peripheral surface and supporting the pressing roller;
   heating means for heating the heat roller;
   a pair of plain bearings for rotatably supporting the roller shaft, each of the plain bearings having an inner surface surrounding said roller shaft, said inner surface including non-contact portions and a shaft contact portion projecting from said non-contact portions of said inner surface, said shaft contact portion being formed integral with said plain bearing and contacting the outer peripheral surface of said roller shaft, the shaft contact portion of each plain bearing having a length in the axial direction less than the total length in the axial direction of said non-contact portions of the inner surface of the plain bearing; and
   urging means for supporting the plain bearings and urging the plain bearings toward said heat roller.

2. The fixing apparatus according to claim 1, wherein said shaft contact portion of each of the plain bearings includes a single strip extending continuously in the circumferential direction of the roller shaft.

3. The fixing apparatus according to claim 1, wherein said shaft contact portion of each of the plain bearings includes a plurality of strips extending continuously in the circumferential direction of the roller shaft and arranged along the axis of the roller shaft.

4. The fixing apparatus according to claim 1, wherein said shaft contact portion of each of the plain bearings includes a plurality of projections arranged in the circumferential direction of the roller shaft.

5. The fixing apparatus according to claim 1, wherein said shaft contact portion of each of the plain bearings includes a plurality of projections extending helically about the axis of the roller shaft.

6. A fixing apparatus comprising:
   a heat roller rotatable upon receiving a torque;
   a pressing roller rotatable in contact with the heat roller;
   a roller shaft having an outer peripheral surface and supporting the pressing roller;
   heating means for heating the heat roller;
   a pair of plain bearings for rotatably supporting the roller shaft, each of the plain bearings having an inner surface surrounding said roller shaft and a shaft contact portion projecting from said inner surface, said shaft contact portion being formed integral with said plain bearing and contacting the outer peripheral surface of said roller shaft, and having a length in the axial direction of said roller shaft shorter than the length of said inner surface in the axial direction of said roller shaft; and
   urging means for supporting the plain bearings and urging the plain bearings toward said heat roller,
   wherein said shaft contact portion of each of the plain bearings includes a plurality of projections extending helically about the axis of the roller shaft.

7. A fixing apparatus comprising:
   a heat roller rotatable upon receiving a torque;
   a pressing roller rotatable in contact with the heat roller;
   a roller shaft having two ends and an outer peripheral surface, the roller shaft supporting the pressing roller, said roller shaft having an annular-shaped bearing contact portion projecting from the outer peripheral surface adjacent each of the ends and formed integral with said roller shaft, said bearing contact portions extending continuously in the circumferential direction of said roller shaft;
   heating means for heating the heat roller;
   a pair of plain bearings for rotatably supporting the roller shaft, each of the plain bearings having an inner surface surrounding said roller shaft and receiving one of the bearing contact portions of said roller shaft, the bearing contact portion of the roller shaft, which contacts the plain bearing, having a length in the axial direction less than the total length in the axial direction of portions of the roller shaft which extend outwardly from said pressing roller and which do not contact the plain bearings; and
   urging means for supporting the plain bearings and urging the plain bearings toward said heat roller.

8. The fixing apparatus according to claim 7, wherein each of said bearing contact portions of the roller shaft includes a single strip.

9. The fixing device according to claim 7, wherein each of said bearing contact portions of the roller shaft includes a plurality of strips arranged along the axis of the roller shaft.

10. A fixing device comprising:
a heat roller rotatable upon receiving a torque;
a pressing roller rotatable in contact with the heat roller;
a roller shaft having two ends and an outer peripheral surface, the roller shaft supporting the pressing roller, said roller shaft having an annular-shaped bearing contact portion projecting from the outer peripheral surface adjacent each of the ends and formed integral with said roller shaft, said bearing contact portions extending continuously in the circumferential direction of said roller shaft;
heating means for heating the heat roller;
a pair of plain bearings for rotatably supporting the roller shaft, each of the plain bearings having an inner surface surrounding said roller shaft and receiving one of the bearing contact portions of said roller shaft, each of said inner surfaces having a length greater in the axial direction of said roller shaft than that of the corresponding one of the bearing contact portions of said roller shaft; and
urging means for supporting the plain bearings and urging the plain bearings toward said heat roller,
wherein each of said bearing contact portions of the roller shaft includes a plurality of strips arranged along the axis of the roller shaft.

* * * * *